United States Patent
Birnkrant et al.

(10) Patent No.: US 11,783,688 B2
(45) Date of Patent: Oct. 10, 2023

(54) ASPIRATING DETECTOR SYSTEM

(71) Applicant: Carrier Corporation, Palm Beach Gardens, FL (US)

(72) Inventors: Michael J. Birnkrant, Wethersfield, CT (US); Hector Ortiz Valencia, Barcelona (ES)

(73) Assignee: CARRIER CORPORATION, Palm Beach Gardens, FL (US)

( * ) Notice: Subject to any disclaimer, the term of this patent is extended or adjusted under 35 U.S.C. 154(b) by 709 days.

(21) Appl. No.: 16/299,461

(22) Filed: Mar. 12, 2019

(65) Prior Publication Data

US 2019/0287364 A1 Sep. 19, 2019

Related U.S. Application Data

(60) Provisional application No. 62/642,194, filed on Mar. 13, 2018.

(51) Int. Cl.
| | |
|---|---|
| *G01N 21/65* | (2006.01) |
| *G08B 17/107* | (2006.01) |
| *G01N 21/53* | (2006.01) |
| *G01N 21/31* | (2006.01) |

(Continued)

(52) U.S. Cl.
CPC .......... *G08B 17/107* (2013.01); *G01N 21/31* (2013.01); *G01N 21/53* (2013.01); *G01N 21/532* (2013.01); *G08B 17/103* (2013.01); *G01N 21/64* (2013.01); *G01N 21/65* (2013.01)

(58) Field of Classification Search
CPC ................. G08B 17/107; G08B 17/10; G01N 2021/317; G01N 21/47; G01N 21/3504
See application file for complete search history.

(56) References Cited

U.S. PATENT DOCUMENTS

| | | | |
|---|---|---|---|
| 5,123,731 A * | 6/1992 | Yoshinaga | G01N 15/0205 356/73 |
| 5,231,378 A | 7/1993 | Dennis et al. | |
| 5,917,417 A | 6/1999 | Girling et al. | |

(Continued)

FOREIGN PATENT DOCUMENTS

| | | |
|---|---|---|
| CN | 203025892 | 6/2013 |
| CN | 203759818 | 8/2014 |

(Continued)

OTHER PUBLICATIONS

Royer, Michael, Jason Livingston, Jess Baker, "Colloquial LED color names can be deceiving", Illuminating Engineering Society website, Nov. 2, 2021.*

(Continued)

*Primary Examiner* — Rebecca C Bryant
(74) *Attorney, Agent, or Firm* — Carlson, Gaskey & Olds, P.C.

(57) ABSTRACT

An aspirating detector system includes a detector and a controller. The detector includes a chamber, a light source adjacent the chamber, and a sensor adjacent the chamber. The sensor is operable to emit sensor signals responsive to received light from interaction of a light beam from the light source with an analyte in the chamber. The controller is connected to receive the sensor signals. The controller is configured to determine whether a target substance is present in the analyte based on an intensity of the received light.

20 Claims, 6 Drawing Sheets

(51) Int. Cl.
*G08B 17/103* (2006.01)
*G01N 21/64* (2006.01)

(56) References Cited

U.S. PATENT DOCUMENTS

| | | | |
|---|---|---|---|
| 6,476,352 B2* | 11/2002 | Aleshin | B23K 26/03 |
| | | | 219/121.64 |
| 7,106,442 B2* | 9/2006 | Silcott | G01N 15/1459 |
| | | | 356/336 |
| 7,440,100 B2* | 10/2008 | Siemens | G01N 21/53 |
| | | | 356/338 |
| 7,669,457 B2 | 3/2010 | Griffith et al. | |
| 8,065,922 B2 | 11/2011 | Ajay et al. | |
| 8,098,166 B2* | 1/2012 | Lang | G08B 17/10 |
| | | | 340/628 |
| 9,075,007 B2 | 7/2015 | McKendree | |
| 9,134,716 B2 | 9/2015 | Cole et al. | |
| 9,269,248 B2 | 2/2016 | Luterotti | |
| 9,384,643 B2 | 7/2016 | Al-Farra et al. | |
| 9,390,605 B2 | 7/2016 | Schmid | |
| 9,576,458 B2 | 2/2017 | Calvert | |
| 9,739,701 B2* | 8/2017 | Matsunami | G01N 15/1459 |
| 10,876,955 B2* | 12/2020 | Welsh | G01N 21/53 |
| 2005/0173638 A1 | 8/2005 | Powell | |
| 2013/0061659 A1 | 3/2013 | Ajay et al. | |
| 2013/0192341 A1 | 8/2013 | Ajay et al. | |
| 2017/0213434 A1 | 7/2017 | Bressanutti et al. | |
| 2019/0287364 A1* | 9/2019 | Birnkrant | G01N 21/532 |

FOREIGN PATENT DOCUMENTS

| | | |
|---|---|---|
| CN | 105374154 | 3/2016 |
| CN | 104200606 | 2/2017 |
| DE | 102010042700 | 12/2013 |
| EP | 1006500 | 7/2000 |
| EP | 2492882 | 8/2012 |
| EP | 2650852 | 10/2013 |
| EP | 2848913 | 3/2015 |
| WO | 02095705 | 11/2002 |
| WO | 2018089629 | 5/2018 |

OTHER PUBLICATIONS

Howard, Marylesa, Luttman, Aaron, Marks, Daniel, and Frayer, Daniel. Mie Scattering Analysis. United States: N. p., 2016. Web. doi:10.2172/1755228.*

U.S. Appl. No. 62/420,852, filed Nov. 11, 2016 titled High Sensitivity Fiber Optic Based Detection.

European Search Report for European Patent Application No. 19162661.3 completed May 24, 2019.

Pertronic Industries Pty Ltd. (2018). FAAST LT conventional aspirating smoke detector. Retrieved on Feb. 15, 2018 from: https://pertronic.com.au/products/aspirating-smoke-detection/product/202.

Product Brochure. (2017). Aspirating smoke detection products. System Sensor. Retrieved Feb. 15, 2018 from: www.systemsensor.com/faast.

Technical Manual. (2011). Air sampling smoke detection system. Honeywell Compact ASD Rev.a. Honeywell Life Safety Systems. Retrieved Feb. 15, 2018 from: http://gentexpert.co.uk/downloads/Ancillary%20Equipment%20/Air_Sampling/COMPACT/COMPACT%20ASD%20Technical%20Manual.pdf.

European Agreement concerning the work of crews of vehicles engaged in international road transport. Consolidated text. Retrieved from: http://www.unece.org/trans/main/sc1/sc1aetr.html pp. 2-12.

Partial European Search Report for European Patent Application No. 19162661.3 completed May 24, 2019.

Summons to Attend Oral Proceedings for European Patent Application No. 19162661.3 dated Mar. 17, 2021.

* cited by examiner

ASPIRATING DETECTOR SYSTEM

CROSS-REFERENCE TO RELATED APPLICATION

This disclosure claims priority to U.S. Provisional Application No. 62/642,194 filed Mar. 13, 2018.

BACKGROUND

Aspirating detectors, such as those for smoke detection, may include one or more chambers, light emitters, and light sensors. For instance, ambient air is circulated through the chamber. The light emitter directs light through the chamber and the light sensor detects the intensity of the light received. The light sensor emits signals that are proportional to the intensity of the light received. When particles from smoke are present in the ambient air, the particles block or scatter a portion of the light. As a result, the intensity of the light received, and thus the signals, changes. This change is used to determine whether smoke is present and may trigger an alarm, for example.

Aspirating detectors may identify the presence of smoke particles but are often limited to smoke detection. As an example, although a fire threat may produce smoke particles, fire threats may also produce other chemical byproducts that can be indicative of a threat and which would be undetectable with a conventional aspirating detector. Additionally, safety considerations are not limited to fire threats, as airborne toxins, bio-agents, organic chemicals, and the like may also pose threats. Additional detection hardware may be added on to a conventional aspirating detector to extend capability, but such add-ons increase system size and cost.

SUMMARY

An aspirating detector system according to an example of the present disclosure includes a detector and a controller. The detector includes a chamber, a light source adjacent the chamber, and a sensor adjacent the chamber. The sensor is operable to emit sensor signals responsive to received light from interaction of a light beam from the light source with an analyte in the chamber. The controller is connected to receive the sensor signals. The controller is configured to determine whether a target substance is present in the analyte based on an intensity of the received light received by the sensor.

In a further embodiment of any of the foregoing embodiments, the chamber is hemispherical.

In a further embodiment of any of the foregoing embodiments, the light source is aimed at the outlet such that, when operated, the light beam exits the chamber through the outlet.

In a further embodiment of any of the foregoing embodiments, the sensor is outside of the chamber and aligned with the light source and outlet.

In a further embodiment of any of the foregoing embodiments, the light source has a variable intensity.

In a further embodiment of any of the foregoing embodiments, the controller is configured to switch the light beam between a detection mode of operation and an analytic mode of operation in response to, respectively, a determination that the target substance is not present and a determination that the target substance is present.

In a further embodiment of any of the foregoing embodiments, the controller is configured to determine a chemical identity of the target substance from a spectrum of the received light over the range of wavelengths via the sensor signals.

In a further embodiment of any of the foregoing embodiments, the controller is configured to trigger an alarm in response to determining the chemical identity and that the target substance is present above a threshold.

In a further embodiment of any of the foregoing embodiments, the controller is configured to determine a chemical identity of one or more non-target substances in the analyte from a spectrum of the received light over the range of wavelengths via the sensor signals and trigger an alarm only if the non-target substance is present above a non-target substance threshold.

In a further embodiment of any of the foregoing embodiments, the controller is configured to determine a dynamic reference condition of the analyte based on one or more wavelengths over the range of wavelengths of the light beam, compare the sensor signals to the dynamic reference condition, and trigger an alarm in response to one or more of the sensor signals exceeding the dynamic reference condition by a threshold amount.

A further embodiment of any of the foregoing embodiments includes a speed-oscillating fluid mover and an analyte collector network connected with the inlet. The analyte collector network has a plurality of ports and the speed-oscillating fluid mover operable to draw analyte through ports into the analyte collector network.

In a further embodiment of any of the foregoing embodiments, the speed-oscillating fluid mover is operable to continuously oscillate.

A further embodiment of any of the foregoing embodiments includes a filter in the analyte collector network and a flow sensor in the analyte collector network downstream of the filter and operable to emit flow sensor signals. The controller is connected with the speed-oscillating fluid mover and the flow sensor to receive the flow sensor signals. The controller is configured to determine whether the filter becomes obstructed based on a response of the flow sensor to speed-oscillations of the speed-oscillating fluid mover.

An aspirating detector system according to an example of the present disclosure includes a passage that has an inlet and an outlet for flow of an analyte, a speed-oscillating fluid mover in the passage, a filter in the passage, a flow sensor in the passage downstream of the filter and operable to emit flow sensor signals, a detector downstream of the flow sensor, and a controller connected at least with the speed-oscillating fluid mover and the flow sensor to receive the flow sensor signals. The controller is configured to determine whether a target substance is present in the analyte and determine whether the filter becomes obstructed based on a response of the flow sensor to speed-oscillations of the speed-oscillating fluid mover.

A further embodiment of any of the foregoing embodiments includes a temperature sensor connected with the controller. The temperature sensor operable to emit temperature sensor signals to the controller.

In a further embodiment of any of the foregoing embodiments, the controller is configured to adjust the flow sensor signals based on the temperature sensor signals.

In a further embodiment of any of the foregoing embodiments, the controller is configured to determine whether the filter becomes obstructed by using a difference between flows at two different speeds of the speed-oscillating fluid mover.

In a further embodiment of any of the foregoing embodiments, the controller determines the filter to be obstructed when the difference between the two flows changes by a threshold amount.

In a further embodiment of any of the foregoing embodiments, the controller is configured to trigger at least one of a fault or an alarm in response to the determination that the filter is obstructed.

In a further embodiment of any of the foregoing embodiments, the controller is configured to modulate speed oscillations of the speed-oscillating fluid mover with respect to a target flow speed at the detector.

In a further embodiment of any of the foregoing embodiments, the controller is configured to modulate the speed oscillations by changing a magnitude of the speed oscillations.

A method for detecting an obstruction in aspirating detector system according to an example of the present disclosure includes moving an analyte through a passage to a detector using a speed-oscillating fluid mover in the passage, where the analyte flows through a filter in the passage, and determining whether the filter becomes obstructed based on a response of a flow sensor downstream of the filter to speed-oscillations of the speed-oscillating fluid mover. The detector includes a chamber, a light source, and a sensor that are configured to determine whether a target substance is present in an analyte.

A further embodiment of any of the foregoing embodiments includes determining whether the filter becomes obstructed by using a difference between flows at two different speeds of the speed-oscillating fluid mover.

In a further embodiment of any of the foregoing embodiments, the filter is determined to be obstructed when the difference between the two flows changes by a threshold amount.

A further embodiment of any of the foregoing embodiments includes triggering at least one of a fault or an alarm in response to the determination that the filter is obstructed.

A further embodiment of any of the foregoing embodiments includes modulating speed oscillation of the speed-oscillating fluid mover with respect to a target flow speed at the detector.

In a further embodiment of any of the foregoing embodiments, the modulating includes changing a magnitude of the speed oscillations.

A method of establishing control parameters for an aspirating detector system according to an example of the present disclosure includes selecting one or more reference environment conditions in which to operate an aspirating detector system in, operating an aspirating detector system in the one or more reference environment conditions for a period of time while varying parameters of a fluid mover, detector, and controller, determining a performance metric based on alarm responses across the reference environmental conditions, and selecting from the varying parameters a combination of parameters that establish the performance metric to be closest to a performance goal.

In a further embodiment of any of the foregoing embodiments, the performance metric is based upon a true positive alarm rate and a false positive alarm rate of the alarm responses across the reference environmental conditions.

A method for detecting a target substance in an aspirating detector system according to an example of the present disclosure includes circulating an analyte through a detector and determining whether a target substance is present in the analyte in the detector based on an intensity of received light via sensor signals.

A further embodiment of any of the foregoing embodiments includes varying an intensity of the light beam.

A further embodiment of any of the foregoing embodiments includes switching the light beam between a detection mode of operation and an analytic mode of operation in response to, respectively, a determination that the target substance is not present and a determination that the target substance is present.

A further embodiment of any of the foregoing embodiments includes determining a chemical identity of the target substance from a spectrum of the received light over the range of wavelengths via the sensor signals.

A further embodiment of any of the foregoing embodiments includes triggering an alarm in response to determining the chemical identity and that the target substance is present above a threshold.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
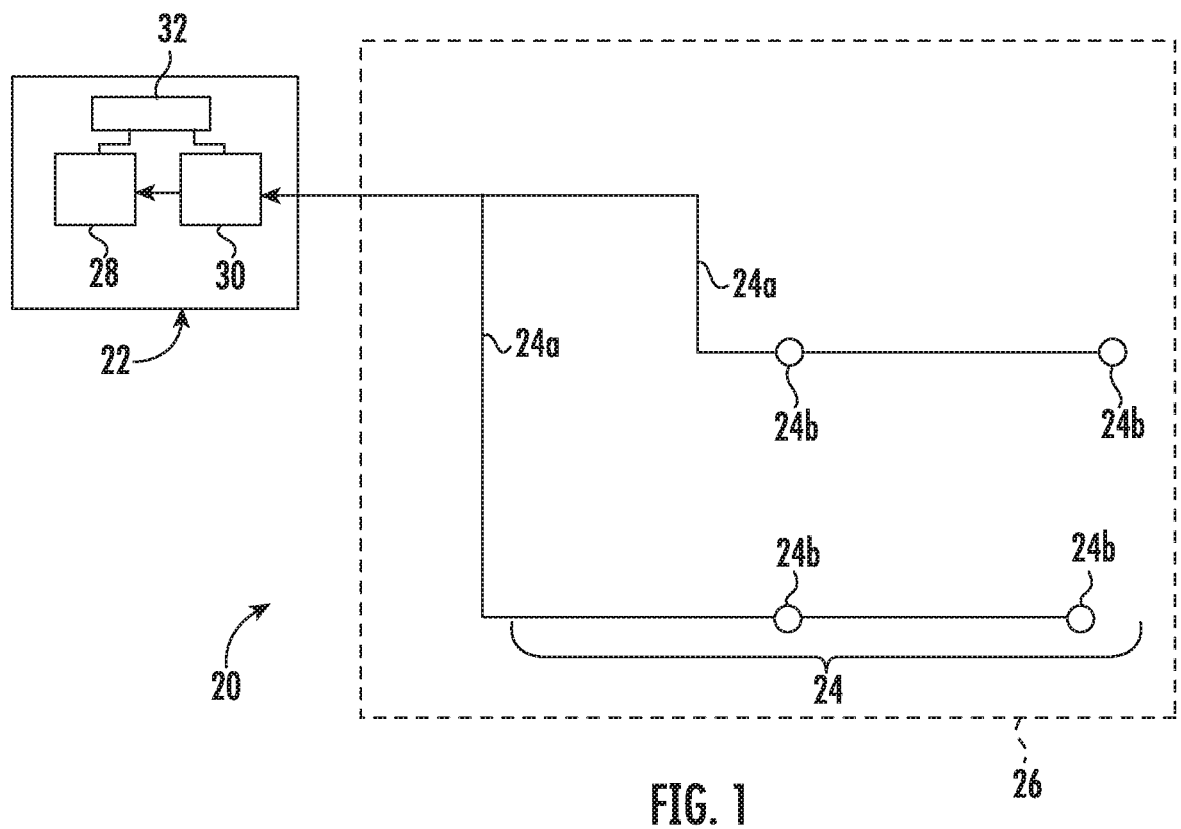
FIG. 1 illustrates an example aspirating detector system.

FIG. 1 schematically illustrates an aspirating detector system 20 ("system 20"). While known aspirating detectors can identify the presence of smoke, the system 20 can provide detection of a variety of chemicals and particles, with enhanced sensitivity, in a compact structure.

The system 20 generally includes a detection unit 22 and an analyte collection network 24. As an example, the analyte collection network 24 is in fluid communication with a region 26 that is to be monitored for one or more target substances. Although not limited, the region 26 may be a room and the analyte may be air drawn from the room into the detector unit 22 for analysis. The detection unit 22 may be used to determine the presence of smoke or chemicals in the analyte (and thus in the region 26), as well as identify the type of chemical(s) in the analyte. Such information may then be used to identify threat situations and, if appropriate, trigger an alarm or other response.

In the illustrated example, the detection unit 22 includes a detector 28, a fluid mover 30, such as a fan, blower, or compressor, and a controller 32. The controller 32 is electrically connected for communication with the detector 28 and the fluid mover 30, to control operation and receive feedback. Enhancing the detection capability of the detection unit 22 may include modification of detector 28, controller 32 or fluid mover 30. In some cases modifications to one of the three detection unit elements may be completed to enhance the operation. In one embodiment, modifications to all three elements in parallel may result in a further increase in performance. This can be attributed to the optimization of the three elements communicating fluidly or electrically in the detection unit. It is to be understood that electrical connections or communications herein can refer to wire connections, wireless connections, optical connections, or combinations of wired and wireless connections.

The detection unit 22 is fluidly connected with the analyte collection network 24. The fluid mover 30 serves to draw analyte (e.g., air) from the region 26 into the analyte collection network 24. In this regard, the analyte collection network 24 may include one or more conduits 24a (e.g., pipes) and multiple ports 24b. By operation of the fluid mover 30, the analyte is drawn through the ports 24b and into the conduits 24a. The analyte collection network 24 delivers the analyte to the detector unit 22 for analysis in the detector 28. Delivery of, and circulation through, the detector 28 is continuous. That is, although the system 20 can be turned ON or OFF, when ON the detector 28 is continuously fed analyte and continuously analyzes the received analyte, as opposed to a "batch" process in which discrete analyte samples are sealed inside of a detector and analyzed batch-by-batch.

Figure 2:
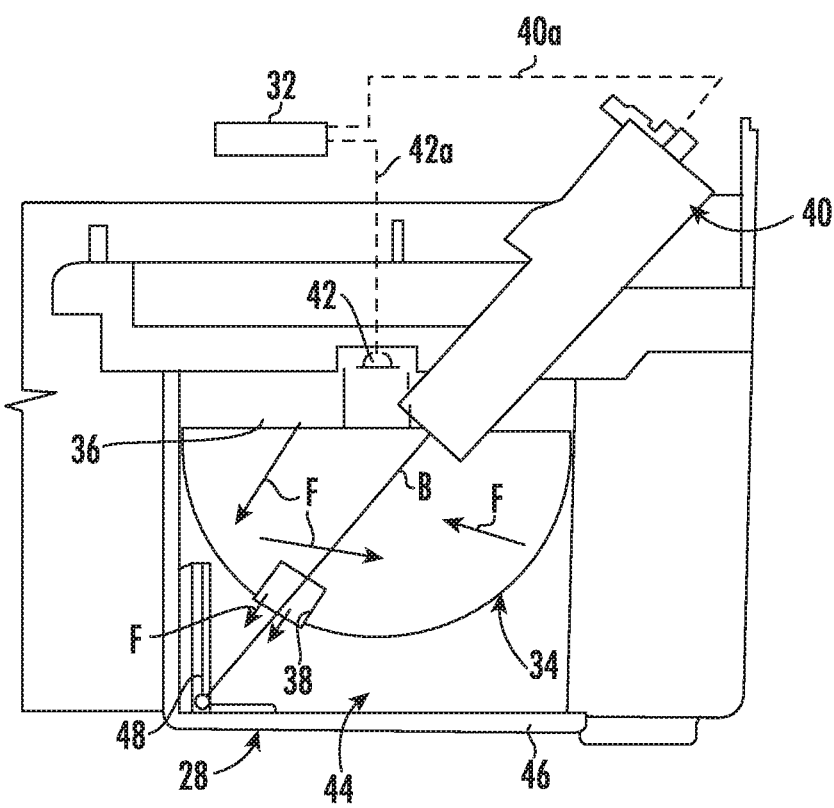
FIG. 2 illustrates an example detector of an aspirating detector system.

FIG. 2 illustrates an example of the detector 28 of FIG. 1. The detector 28 includes a chamber 34 that has an inlet 36 and an outlet 38 for flow of the analyte, which is represented at F. The inlet 36 is fluidly connected with the analyte collection network 24, and the outlet 38 may be fluidly connected with the region 26 to exhaust analyzed analyte back into the region 26.

The detector 28 includes a light source 40 adjacent the chamber 34. The light source 40, when operated, emits a light beam (represented at B) through the chamber 34 over a range of wavelengths. The light source 40 is electrically connected with the controller 32, as represented at 40a, such that the controller 32 may control operation of the light source 40 with regard to pulse modulation by varying light intensity (power or energy density), varying light wavelength, or varying pulse frequency. As an example, the light source 40 is a laser that can emit a laser beam at a wavelength that can be altered in a controlled manner across a range of wavelengths. Moreover, at each wavelength, the light intensity and/or pulse frequency can be varied in a controlled manner. For instance, the controller 32 may scan the analyte in the chamber 34 across ranges of wavelengths, intensities, and/or pulse frequencies as described further below. As used herein, "light" refers to wavelengths in the visible spectrum, as well near infrared and near ultraviolet regions. As an example the light source is a laser that has a laser energy density or power density of 0.01-100 mW/cm$^2$.

The detector 28 also includes a sensor 42 adjacent the chamber 34. The term "adjacent" refers to the sensor's 42 close proximity or adjoined with the chamber 34. In this regard, the sensor 42 may be inside the chamber 34, outside the chamber 34, or portions of the sensor are inside the chamber 34 and other portions are outside of the chamber 34. The sensor 42 may be a solid state sensor, such as but not limited to, a photosensor. Example photosensors may include photodiodes, bipolar phototransistors, photosensitive field-effect transistors, and the like. In this example, the sensor 42 is offset from the direct path of the light beam B, to capture received scattered light from the analyte.

The sensor 42 is electrically connected with the controller 32, as represented at 42a, and is operable to emit sensor signals to the controller 32 responsive to received scattered light from interaction of the light beam B with the analyte in the chamber 34. The sensor signals are proportional to the intensity of the received scattered light received by the sensor 42.

The controller 32 may include hardware (e.g., one or more microprocessors and memory), software, or both, that are configured (e.g., programmed) to carry out the functionalities described herein. The controller 32 receives the sensor signals and is configured to analyze the sensor signals and make several determinations. The controller 32 determines whether a target substance is present in the analyte based on an intensity of the received scattered light and the controller 32 also determines a chemical identity of the target substance from a spectrum of the received scattered light over the range of wavelengths. These two determinations are referred to herein as, respectively, a presence determination and an identity determination.

The controller 32 can make a presence determination by analyzing the intensity of the sensor signals. For instance, when no target substance is present, the sensor signals are low, indicating no analyte present. This can be considered to be a baseline or background signal. When a target substance is present and scatters light, the sensor signals increase in comparison to the baseline signal. Higher amounts of target substance produce more scattering and a proportional increase in the sensor signal. An increase that exceeds a predetermined threshold, which may be correlated to a certain concentration in the analyte, serves as an indication by the controller 32 that a target substance is present.

The controller 32 can make an identity determination by analyzing the sensor signals over the range of wavelengths of the light beam. For instance, the controller 32 scans the analyte over the range of wavelengths to collect temporal spectra of intensity versus wavelength (or equivalent unit). Different target substance respond differently with regard to absorbance and scattering of different wavelengths of light. Thus, the spectra of different types of target substances (taking into account a baseline or background spectra) differ and may be used as a signature to identify the type of target substance by comparison of the spectrum with a spectra library or database, which may be in the memory of the controller 32. In this manner, the detector 28 can identify chemicals such as, but not limited to, carbonyls, silanes, cyanates, carbon monoxide, and hydrocarbons.

Additionally, the controller 32 may scan the analyte in the chamber 34 across a range of intensities and/or pulse frequencies, to generate additional information about target substances that may also be used to identify the presence or type of target substance. For instance, the controller 32 may scan the analyte at a first intensity to collect information based on Rayleigh scattering and then scan at a second, different intensity to collect information based on Raman scattering. The first intensity and wavelength in one example could be scanning for an analyte at 660 nm and at a power density of 1 mW/cm$^2$ and collecting scattered light at 660 nm, which is indicative of Rayleigh scattering. Then scanning at 660 nm and at a power density of 10 mW/cm$^2$ with a filter on the light sensor 42 to collect light between 625 nm and 405 nm, which is indicative of anti-stokes Raman scattering. Similar examples may be generated with other optical material properties, such as Stokes scattering, anti-Stokes scattering, two-photon fluorescence and fluorescence.

The presence and identity determinations may be used individually or in combination to estimate a threat level and, if appropriate, trigger an alarm or other response. In particular, the combination of the presence and identity determinations may permit extended, intelligent capability. For example, the identity determination may serve as a validation of the presence determination (or vice versa). In another example, the presence and identity determinations are used together to trigger an alarm or other response only when predesignated types of chemicals are detected and identified. Thus, the detector 28 may be programmed to respond to one or more target chemicals in the region 26, while disregarding other, non-target chemicals that may be present. Further, the detector 28 may be programmed to respond to non-target chemicals in the region 26, while disregarding others, when the non-target chemicals are present at concentrations above a predefined threshold at which the non-target chemicals would be toxic. Such a capability can also be used to reduce false alarms from non-target chemicals by triggering an alarm only for target chemicals but not non-target chemicals.

The configuration of the detector 28 facilitates good sensitivity and reliability for early warning capability. As examples, early warning sensitivity for smoke detection is 0.2 obs %/ft, and early warning sensitivity for a substance such as $H_2S$ is 2-5 ppm. One feature that contributes to good performance is that the chamber 34 is hemi-spherical. The hemi-spherical geometry serves to deflect the flow of the analyte as it enters the chamber 34. In this example, the flow from the inlet 36 enters the chamber 34 and deflects off of the left side or half of the chamber 34 toward the right side or half of the chamber 34. From the right side or half, the flow deflects back toward the center region of the chamber 34 and then through the outlet 38. The flow thus mixes well inside of the chamber 34 and focuses the flow and any particles to the outlet 38.

The hemi-spherical shape may also enhance collection of the scattered light. The sensor 42 is located central to the curvature of the walls of the chamber 34. While a portion of the scattered light may be directly received by the sensor 42, much of the light is scattered in other directions, toward the walls of the chamber 34. This scattered light reflects off of the walls of the chamber 34, which are mirrored, and toward the sensor 42 because of the semi-spherical shape and central location of the sensor 42. Thus, not only is the exposure increased to increase light scattering, but a greater amount of the scattered light is directed to the sensor 42.

The orientation of the light source 40 with regard to the outlet 38 also serves to enhance sensitivity. The light source 40 is aimed at the outlet 38 such that, when operated, the light beam B exits the chamber 34 through the outlet 38. In this example, the detector 28 includes a secondary chamber 44 between an outer housing 46 and the chamber 34, and a beam stop 48 disposed in the secondary chamber 44. The beam stop 48 diverts and/or absorbs the light beam B to reduce reflect-back into the chamber 34, which could otherwise reduce sensitivity to the received scattered light and debit the presence and identity determinations.

The controller 32 may also be configured to determine a dynamic reference (baseline) condition of the analyte based on one or more wavelengths over the range of wavelengths, compare the sensor signals to the dynamic reference condition, and trigger an alarm in response to one or more of the sensor signals exceeding the dynamic reference condition by a threshold amount.

As an example, the signal from the sensor 42 is sampled at given intervals, such as once a second. The sensor signal may also be processed to provide a meta-value. A meta-value is a value derived from the sensor 42 but may not be used directly to determine the presence of a gas or smoke. The signal or meta-values are then statistically analyzed. The distribution of readings is statistically analyzed in the controller 32. In an exemplary analysis, a mean and a standard deviation of the signal level are calculated from the distribution. The distribution curve is in a constant state of being updated (i.e. the dynamic reference condition), the samples reducing exponentially in significance in relation to the samples taken subsequent to them. In one example according to Equation 1 below, Y is the new mean of the signal, Y1 is the most recent sampled signal, w is a weighting factor, and $Y_{old}$ is the current mean of the signal. As an example, a weighted average over a one month period w=1/2592000 1/sec if signals were collected once per second (assuming a 30-day month). The most recent readings are thus the most significant while older readings are less significant and eventually become completely insignificant.

$$Y = Y1 * w + Yold * (1-w) \qquad \text{Equation 1:}$$

Adjustments can be made to reduce the probability of false alarms without sacrificing accurate detection of target chemicals. For example, the probability of a given signal level occurring may be calculated from the instant distribution, or conversely a given probability of a signal level occurring will correspond to a specific signal level. Thus an alarm level can be continually re-set for a given fixed probability of occurring. In the instance of one sample being taken every second, if the level is set to correspond to 1 chance in $10^6$, then an unwanted alarm would be expected only once every 115 days on average from normal fluctuations of the signal level. If it is set at 1 in $10^7$, an unwanted alarm would be generated on average once every 3 years. The probability of this signal level occurring five times in a row will be once every 243 years. Such a method provides the means for setting the alarm level given theoretical probability of an unwanted alarm occurring. Also the mean level of signal is known from the assumed normal distribution and any fall in this below what is expected may indicate a fault in the sensor 42.

Moreover, since the distribution is continually updated as new sample signals are collected, the signal level that corresponds to the given constant probability changes dynamically. That is, rather than setting a constant signal level as an alarm threshold, which would have a variable probability as new sample signals are collected, the probability is constant and the corresponding signal level varies.

Figure 3:
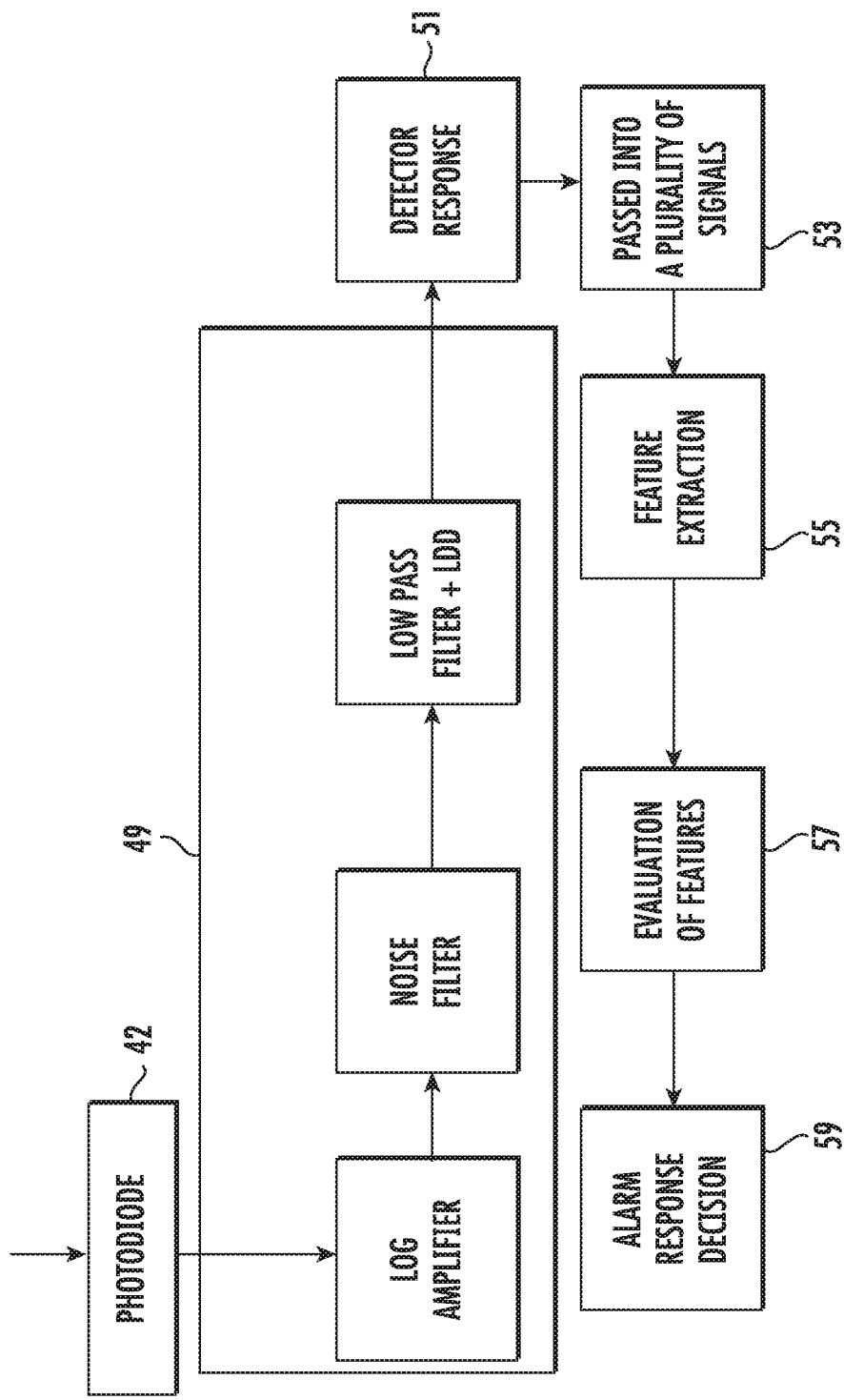
FIG. 3 illustrates a flow diagram of an example signal processing technique.

FIG. 3 shows a schematic flow diagram of signal processing for making an alarm response decision. An algorithm generates the meta-values executed by the controller 32, where each of the signals represents scattered light received by the sensor 42. Optionally, the signals may be pre-processed at block 49 for amplification, noise filtering, and low pass filtering plus lossless discrete differentiation (LDD), which results in a processed signal at 51. The processed signal (or, if the signal is not pre-processed, raw detector data) indicative of scattered light is parsed at block 53 into a plurality of signals. In the illustrated, non-limiting embodiment, background signals are removed from the data before the signal features are evaluated to provide meta-values. Through integration, pulse compression, and/or feature extraction at block 55 one or more characteristics or features (pulse features) of the signal may be determined. Examples of such features include, but are not limited to, a peak height, an area under a curve defined by the signal, statistical characteristics such as mean, variance, and/or higher-order moments, correlations in time, frequency, space, and/or combinations thereof, and empirical features as determined by deep learning, dictionary learning, and/or adaptive learning and the like.

In an example of the feature extraction at block 55, the signal of interest may be parsed and pulse features extracted from the raw signal being collected by the sensor 42. The set of raw data for the algorithm analysis may cover a period of time. For example, a period of recorded light intensity may cover 1e-9 seconds to 1e3 seconds, 1e-6 seconds to 1e3 seconds, or 1e-3 seconds to 1e3 seconds. The features extracted from the signal may include, but are not limited to, height, full width at half maximum, signal pick-up time, signal drop-off time, group velocity, integration, rate of change, mean, and variance, for example.

At block 57, the alarm is generated based on the input value. The alarm response decision looks for a matching relationship between the features, evaluation, and a value in order to determine the presence of smoke or gas. In one example, the alarm response decision is based on a Boolean operator that would produce a true or false output. A true output would indicate the presence of smoke or gas. The relationship may be defined as when the pulse height feature exceeds a threshold value. In this case, the relationship is true when the sensor 42 records an intensity larger than a threshold and an alarm is then triggered at block 59.

The feature evaluation in block 57 may also employ classifiers including those that may be learned from the signal via deep learning techniques including, but not limited to deep neural networks, convolutional neural networks, recursive neural networks, dictionary learning, bag of visual/depth word techniques, Support Vector Machine (SVM), Decision Trees, Decision Forests, Fuzzy Logic, and the like. The classifiers may also be constructed using Markov Model techniques, Hidden Markov Models (HMM), Markov Decision Processes (MDP), Partially Observable MDPs, Markov Decision Logic, Probabilistic Programming, and the like. The resulting meta-values from the classifiers is then analyzed statistically.

In a further example of feature evaluation in block 57, the relationship between the light scattering and the magnitude or presence of a condition is inferred by measuring a signal's causality and dependency. As an example, the measure of a causality utilizes one or more signal features as an input and determines one or more outputs from a calculation of a hypothesis testing method, foreground ratio, second derivative, mean or Granger Causality Test in order to identify the relationship between the light scattering signals collected by sensor 42 and the presence of the smoke or gas from nuisances. Similarly, one or more signal features may be used as an input to evaluate the dependency of a signal, which would enable determination of smoke or gas from nuisances. One or more outputs are selected from a calculation of a correlation, fast Fourier transform coefficients, a second derivative, or a window. The magnitude and presence of a condition may be calculated utilizing one or more evaluation approaches: a threshold, velocity, rate of change or a classifier. The detection algorithm may include utilizing the output from the calculation causality, dependency or both as meta-values. This is used to indicate the presence of the condition at one or more nodes and initiate a response.

In further examples, the controller 32 is configured via communication with the light source 40 to switch the light beam between first and second modes of operation. For instance, the light beam is switched between a detection mode of operation and an analytic mode of operation. The detection mode may be used when there is no target substance detected in the analyte, and the analytic mode may be used when the presence of a target substance has identified. The controller 32 can switch between the modes in response to identifying the presence of a target or non-target substance with regard to a predetermined threshold or, conversely, when a target or non-target substance is no longer present. In one variation, the controller 32 switches between the modes in response to a predetermined threshold concentration of a target substance.

In the detection mode of operation, the alarm threshold is set to reduce or minimize false alarms. In the analytic mode, the light beam is operated to increase or maximize information from the analyte. Examples of switches between these modes may include, but are not limited to, changing beam intensity, changing beam pulse frequency, changing beam wavelength or wavelength range, or changing combinations of intensity, frequency, and wavelength. For instance, in response to a determination that a target substance is present with regard to a predetermined threshold, the intensity, pulse frequency, wavelength, wavelength range, or combinations of these may be adjusted to switch from a setting that is targeted to minimize false alarms to a setting that is targeted to maximize information from the analyte. Conversely, in response to a determination that a target substance is not present with regard to the predetermined threshold, the intensity, pulse frequency, wavelength, wavelength range, or combinations of these may be adjusted to switch from the setting that is targeted to maximize information from the analyte to the setting that is targeted to minimize false alarms.

Figure 4A:
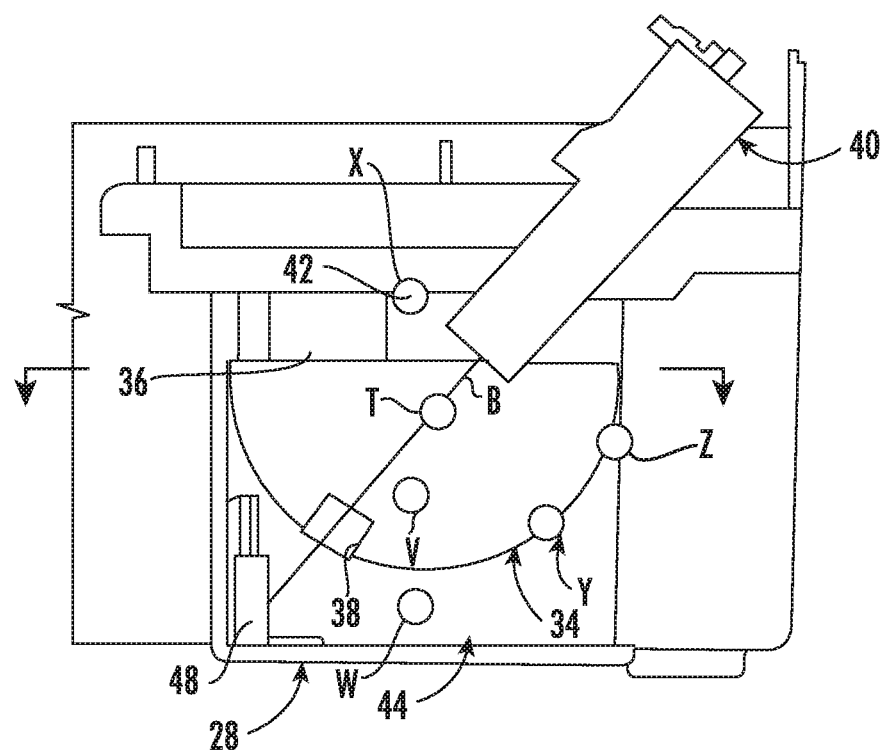
FIG. 4A illustrates alternate sensor positions in the detector of the aspirating detector system.
Figure 4B:
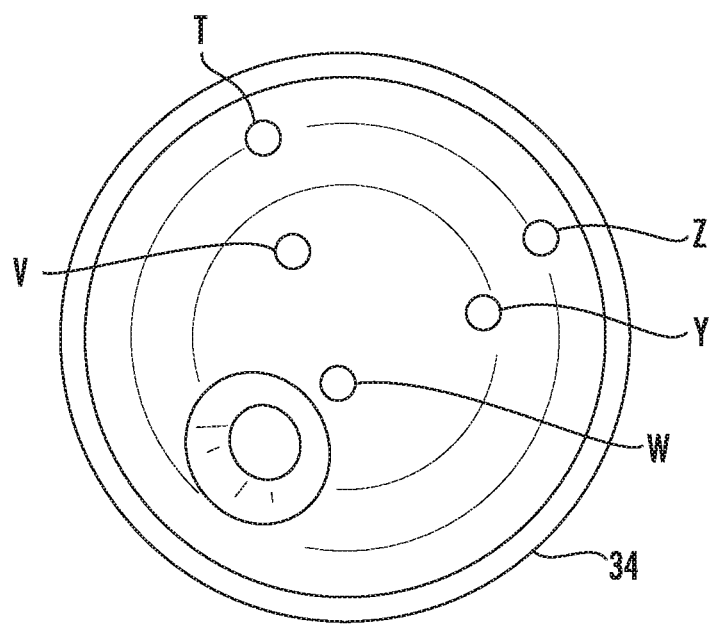
FIG. 4B illustrates a sectioned view of FIG. 4A.

FIGS. 4A and 4B illustrate variations of the detector 28. In FIG. 4A the sensor 42 is centered above the chamber 34, which is shown as position X. The sensor 42, however, may alternatively be located at other positions adjacent the chamber 34; as will be described below, different sensor positions may be used to distinguish different conditions such as may be caused by hazards or mere nuisances. For example, the sensor 42 may be located at any of alternate positions T, V, W, Y, and Z (multiple sensors at these positions may be referred to herein as sensors 42). The positions X, T, V, W, Y, and Z, even if there is no detector, may be used to describe the spatial locations. For example, W, Y, and Z fall on a plane created by the laser beam B between laser 40 and beam stop 48 and position X. Position W is approximately 180 degrees from position X. A line from position Z to position X is approximately 45 degrees to a line between position W and X. A line from position Y to position X is approximately 30 degrees to a line between position W and X. Positions V and T are out of the plane of positions W, Y, Z and X. A line from position T to position X is approximately 45 degrees to a line between position W and X. A line from position V to position X is approximately 30 degrees to a line between position W and X. In one example, the plane created by W, V, T and X is orthogonal to the plane of positions W, Y, Z and X.

In further variations, the detector 28 includes multiple sensors 42 located at any of positions X, T, V, W, Y, and Z. For instance, the detector includes 2, 3, 4, 5, or 6 sensors 42 arranged among positions X, T, V, W, Y, and Z. The sensors 42 record the scattered light from the analyte at an angle with respect to the light source 40. The angular- and dependent scattering is related to the size, shape, and refractive index of the particulates in the analyte inside the chamber 34.

The scattered light collected by sensors 42 may then be used to distinguish smoke particulates related to a fire from dust and water vapor that is associated with nuisances from the environment, all of which can cause different, unique responses across the sensors 42. For instance, one of the positions X, T, V, W, Y, or Z may be in a back-scattering position and another of the positions X, T, V, W, Y, or Z may be in a forward-scattering position. The light intensity as a function of obscuration at these two positions is different and may then be used to compute different features that are used in an algorithm to distinguish smoke particles from dust and moisture.

Figure 5:
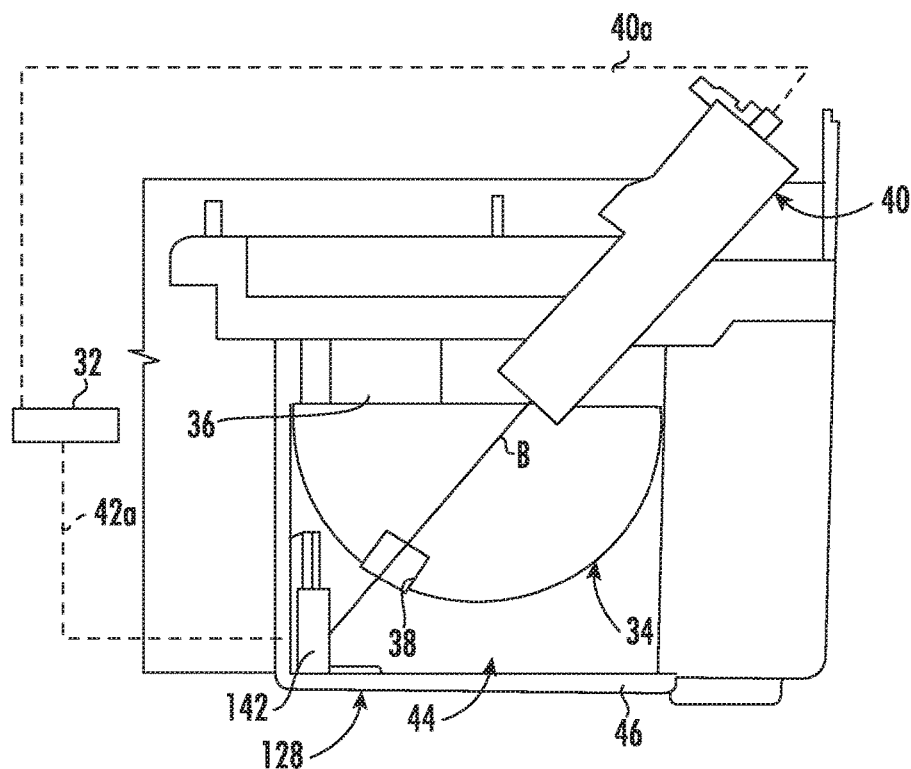
FIG. 5 illustrates another example detector.

FIG. 5 illustrates another example detector 128. In this disclosure, like reference numerals designate like elements where appropriate and reference numerals with the addition of one-hundred or multiples thereof designate modified elements that are understood to incorporate the same features and benefits of the corresponding elements. Thus, the detector 128 of FIG. 5 includes the same features/benefits of the detector 28 from above. In this example, the sensor 142 is adjacent but outside of the chamber 34, in the secondary chamber 44. The sensor 142 is aligned with the light source 40 (i.e., the path of the light beam B) and outlet 38 such that the light beam B directly impinges on the sensor 142. Like the sensor 42, the sensor 142 is operable to emit sensor signals to the controller 32 responsive to received light and the sensor signals are proportional to the intensity of the received light. However, because the sensor 142 is aligned with the light source 40 rather than offset (as the sensor 42), the light that is received by the sensor 142 is light that is transmitted through the analyte. Light that is absorbed and/or scattered by a target substance in the analyte may not be received by the sensor 142.

For the sensor 42, the sensor signals represented the intensity of received scattered light. However, because of the position of the sensor 142, the sensor signals in the detector 128 represent received transmitted light. The controller 32 uses this received transmitted light in a similar manner as the received scattered light signals to make a presence determination. When a target substance is present and absorbs or scatters light, the sensor signals decrease in comparison to the baseline signal. Higher amounts of target substance produce more absorbance and scattering and a proportional decrease in the sensor signals. A decrease that exceeds a predetermined threshold may serve as an indication by the controller 32 that the target substance is present. Additionally, like the sensor 42, the sensor 142 may be used to make identity determinations by analyzing the sensor signals over the range of wavelengths of the light beam to collect temporal spectra of intensity versus wavelength (or equivalent unit).

Figure 6:
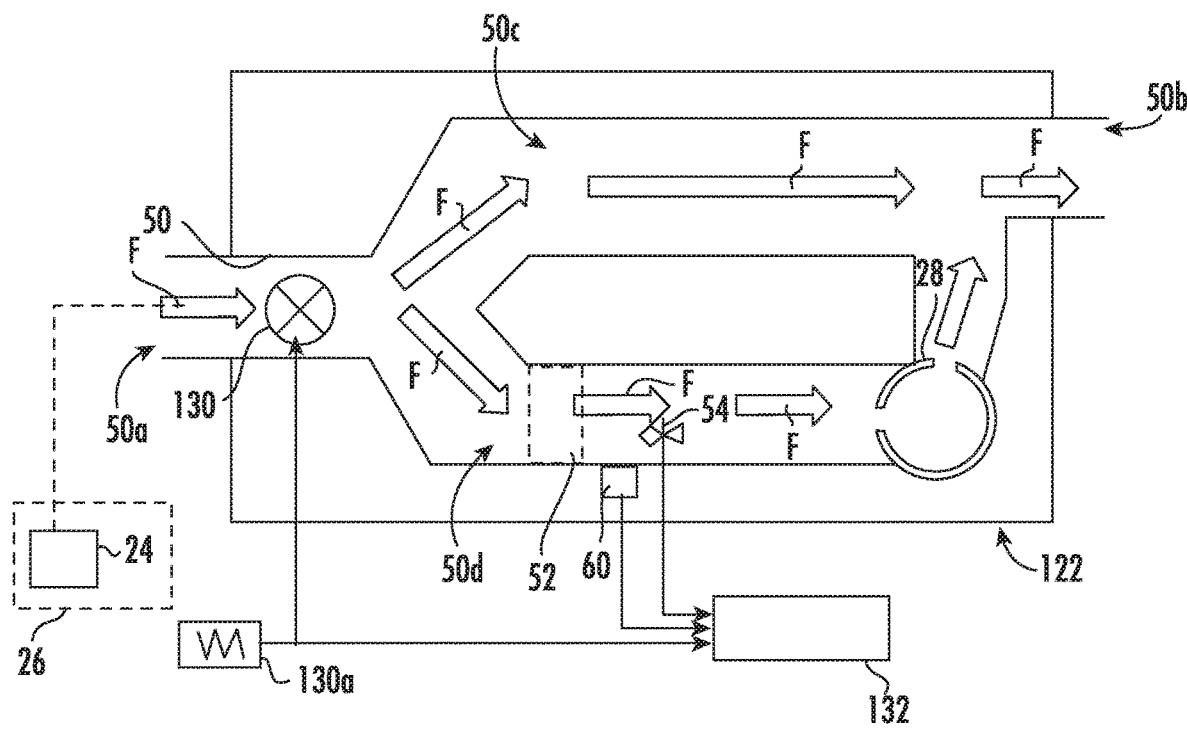
FIG. 6 illustrates a detection unit that has a speed-oscillating fluid mover and flow sensor, for detecting obstruction of a filter.

FIG. 6 illustrates another example of a detector unit 122 that may be used in the system 20. As noted above, in this disclosure, like reference numerals designate like elements where appropriate and reference numerals with the addition of one-hundred or multiples thereof designate modified elements that are understood to incorporate the same features and benefits of the corresponding elements. Thus, the detector unit 122 of FIG. 6 includes the same features/benefits of detector unit 22 of FIG. 1, and the detector 28 of FIG. 6 includes the same features/benefits of the detector 28/128 from above. The detector unit 122 includes a passage 50 that has an inlet 50*a* and an outlet 50*b* for flow of an analyte, which again is represented at F. In this example, the passage 50 splits into first and second legs 50*c*/50*d*. The first leg 50*c* is a bypass leg and the second leg 50*d* is an analysis leg.

A speed-oscillating fluid mover 130 is disposed in the passage 50. The fluid mover 130 is electrically connected with a controller 132, which can control operation of the fluid mover 130 and receive feedback. The controller 132 may be used in addition to the controller 32 associated with the detector 28 and described above. Alternatively, the described functionalities of the controllers 32/132 may be combined into a single controller. The fluid mover 130 may be a fan, blower, or compressor that is capable of being operated at multiple controlled speeds and may continuously oscillate. An average flow is known or may be determined by an installer and used to adjust an average and "worst case" transit time from the fluid mover 130 or other inlet reference position to the detector 28 (which may include any of the features of the detector 128 of FIG. 5). This may then be used to plan the installation pipe layout of the passage 50.

There is a filter 52 downstream of the fluid mover 130, in the second leg 50*d* of the passage 50. A flow sensor 54 is also disposed in the second leg 50*d* of the passage 50, downstream of the filter 52. The flow sensor 54 is electrically connected to the controller 132 and operable to emit flow sensor signals thereto. The detector 28 (or alternatively 128) may be located downstream of the flow sensor 54.

The fluid mover 130 operates to draw analyte into the analyte collection network 24 and, in turn, the detector unit 122. The analyte may contain debris, large particles, or other pollutants that are undesired in the detector 28. In this regard, the filter 52 serves to remove pollutants from the incoming flow of analyte to produce a cleaner or "clean" stream of flow of the analyte downstream of the filter 52. However, accumulation of pollutants in the filter 52 could reduce analyte flow to the detector 28, thus debiting detector performance. In this regard, the speed-oscillating fluid mover 130, flow sensor 54, and controller 132 facilitate identification of such obstructions, which may be used to enhance system performance. For instance, the controller 132 is configured to determine whether the filter 52 becomes obstructed based on a response by the flow sensor 54 to speed-oscillations of the speed-oscillating fluid mover 130.

As an example, the controller 132 oscillates the speed of the fluid mover 130 (i.e., between two speed set-points) via an oscillation generator circuit 130*a*, which may be in the fluid mover 130, outside the fluid mover 130, or in the controller 132. While the filter 52 is unobstructed, changes in the speed of the fluid mover 130 between two different set point speeds generate two corresponding flows of the clean stream by the flow sensor 54. The difference between these two flows of the clean stream at the two different speeds represents an unobstructed condition and may be used to identify an obstructed condition. For instance, when the filter 52 becomes obstructed, the difference between the two flows by the flow sensor 54 changes. The controller 132 then decides that an obstruction condition exists if this change in the difference between the two flows exceeds a threshold. In response, the controller 132 may trigger a fault, indicate that the operation of the detector 28 may have reduced reliability, and/or cease operation of the detector 28.

As an example, the controller 132 oscillates the speed of the fluid mover between Speed 1 and Speed 2, which differs from Speed 1 by plus or minus 1-500%, or in more limiting examples from 1-30%. At Speed 1, the flow at the flow sensor 54 is 5.5 meters per second (m/s) and at Speed 2 the flow at the flow sensor 54 is 9.5 m/s. The difference between the flows is thus 4.0 m/s. Over time, assuming no obstructions in the filter 52, the flows at the two speeds are constant and the difference between the flows is thus also constant. The filter 54 then takes on particles or debris from the analyte such that flow of the analyte through the filter 54 is partially blocked. Now, at Speed 1, the flow at the flow sensor 54 is 2.0 m/s and the flow at Speed 2 is 3.5 m/s, for a difference in flow of 1.5 m/s. The controller 132 has a preset threshold change of 1.0 m/s, meaning that a change of 1.0 m/s or more in the 4.0 m/s value from the unobstructed state indicates an obstruction. The change in the difference value from 4.0 m/s to 1.5 m/s is 2.5 m/s, which is greater than the 1.0 m/s threshold. As a result, the controller 132 identifies that that an obstruction condition exists and triggers an alarm or other response.

In a further example, the flow sensor 54 includes a constant-power heating element, such as a resistor powered at constant current, and a thermometer (or other temperature sensor) attached to the heating element. Changes in the flow of analyte over the heating element change the rate of heat exchange of the heating element, thereby altering the temperature at the thermometer. While the filter 52 is unobstructed, the speed changes of the fluid mover 130 will thus change the temperature. When the filter is obstructed, the temperature will not change or will change less, thereby indicating existence of an obstruction in relation to a preset threshold.

The controller 132 could also be connected with an additional thermometer or other temperature sensor 60 to provide enhanced control capability. For instance, the temperature from temperature sensor 60 may be used as a baseline to compensate for temperature variations of the analyte that are unrelated to flow of the analyte by the flow sensor 54.

The controller 132 may also use the speed-oscillating fluid mover 130 to enhance performance of the detector 28 (or alternatively detector 128 may be used here). For example, the speed oscillations may be modulated with respect to a target average flow speed at the flow sensor 54, and thus an average flow speed into the detector 28. For instance, the magnitude of the speed oscillations (i.e. a speed increase or a speed decrease relative to a reference speed) may be changed such that the average flow speed at the flow sensor 54 is maintained at a target average flow speed or within a target range for the average flow speed. Maintaining the average flow speed constant at a target average flow speed or within a target range in turn may enhance detector reliability and sensitivity. Maintaining a certain flow value average also ensures that transportation time of the fluid from the sampling point to the detector has a certain average value, which is a determinant characteristic of a detection installation, because fire or target substance detection is always lagged by the transportation time from intake at a node 24b through conduits 24a to scanning at detector 28. The period of the oscillations may vary from 1 second to 240 seconds, and in more limiting cases from 6-12 seconds.

The controller 132 may also be configured to determine a dynamic reference (baseline) condition of the analyte based on one or more wavelengths over the range of wavelengths, compare the sensor signals to the dynamic reference condition, and trigger an alarm in response to one or more of the sensor signals exceeding the dynamic reference condition by a threshold amount. The signal from the detector 28 is sampled at given intervals, such as greater than 5 samples per oscillation of the fan speed. The sensor signal may also be processed to provide a meta-value. The signal or meta-values are then statistically analyzed. The distribution of readings at given points in the fan speed are statistically analyzed in the controller 132. A mean and a standard deviation of the signal level are calculated from the distribution. The distribution curve is in a constant state of being updated. This constant value for the concentration is then obtained by filtering the data. A filter could be averaging as an example.

The raw sensor signals are also analyzed to relate light scattering in the detector 28 as a function of the oscillating flow rate to enhance detectability needed to achieve high sensitivity particle or gas detection. This may be achieved by performing temporal analysis to evaluate frequency dependent sensor signals to the period in the air speed oscillation. The detection algorithm may be configured to apply one or more of a Fourier transform, Wavelet transform, space-time transform, Choi-Williams distribution, Wigner-Ville distribution and the like, to the signals to convert the signals from a temporal domain to a frequency domain. This transformation may be applied to the signals when the sensors 42 are being analyzed individually, collectively during a data fusion, or both.

Figure 7:
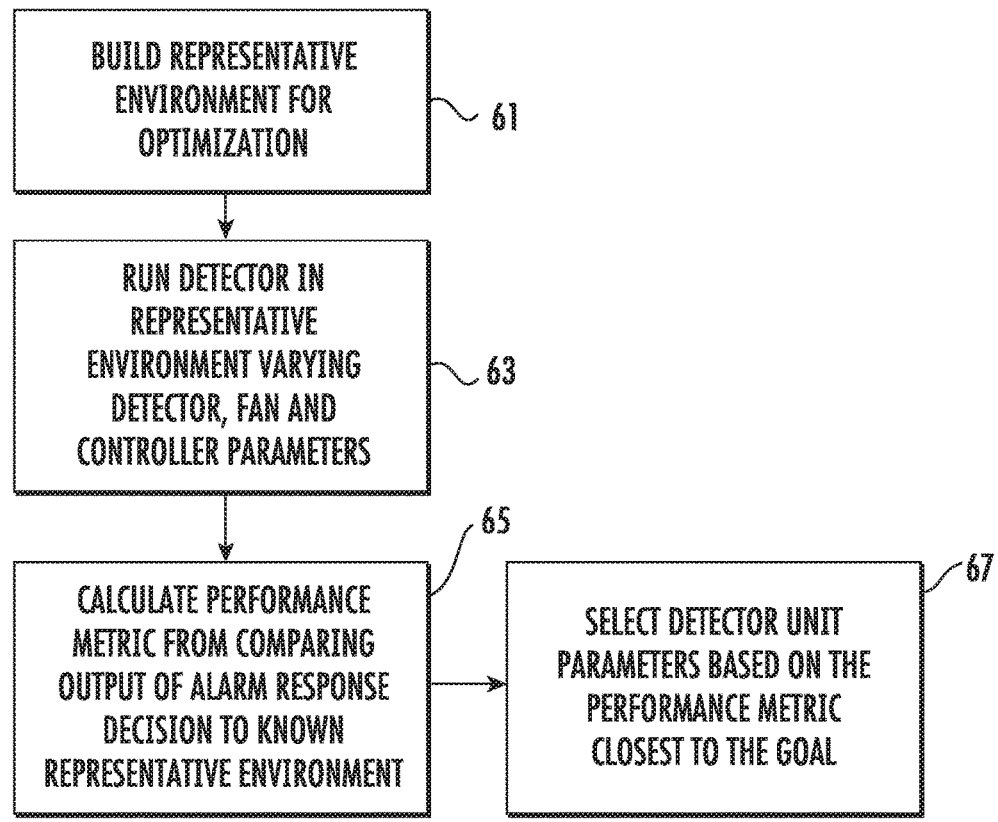
FIG. 7 illustrates a flow diagram of an example linear optimization.

One example approach for establishing control parameters to enhance operation of the fluid mover 130, controller 132, and detector 28 (or 128) uses linear optimization. An example linear optimization approach is shown in the flow diagram in FIG. 7 and starts at block 61 with defining a set of reference environmental conditions under which to test the response of the detector 28, as further explained below. This is followed in block 63 by operating the detector 28 in a reference environment and varying control parameters of the fluid mover 130, controller 132, and detector 28. Performance metrics are then calculated at block 65 by comparing output of alarm response decisions to known representative environments. Detector unit parameters are then selected at block 67 based on the performance metric closest to the performance goal.

The reference set of environmental tests is intended to represent the conditions in which the detector 28 (or 128) operates in its end use environment. The reference set of environmental tests may be in a lab or based on data collected during the operation of the detector 28 in its end use environment. In one example, the lab tests are prescriptive reference tests. In another example, the detector 28 is already in the field and the reference tests are performance-based environmental tests that have data categorized into background, nuisances, smoke or gas as further described below with reference to FIG. 8. This categorization sets the ground truth. The detector response is then compared to the ground truth to determine performance. The resulting performance for a set of parameters may be evaluated. The optimization method may thus be run before installation or after installation in a building, data center, or industrial complex.

Figure 8:
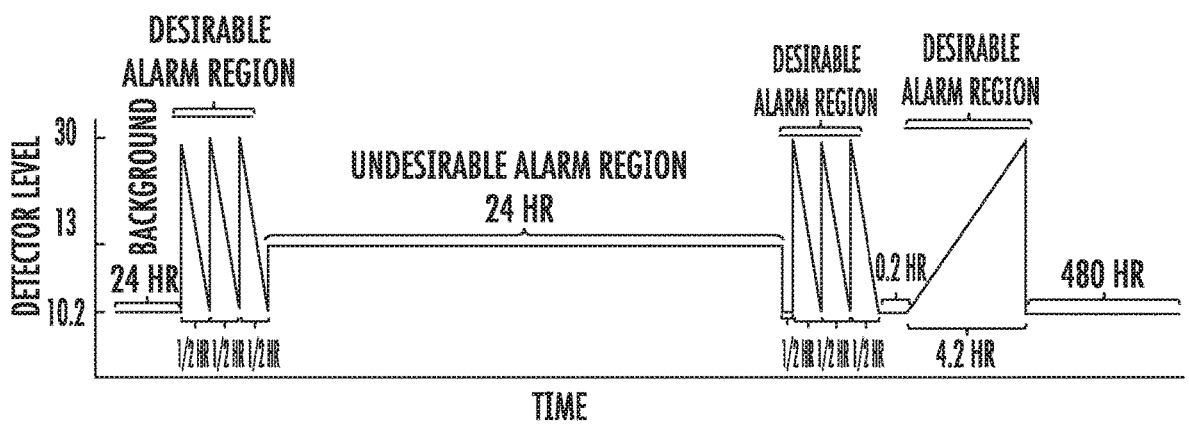
FIG. 8 illustrates a graph of sensor signal level versus time to demonstrate an example of alarm threshold functionality.

In the example shown in FIG. 8, the reference test has background, undesirable regions of alarm, and desirable regions of alarm, each labeled with the time period in hours ("HR") over which it occurs. The frequency spacing and timing, number and order may be changed or adjusted. The background is the normal environment that the detection unit is placed. The undesirable regions of alarm are those areas where nuisances such as dust or water vapor maybe present. The desirable alarm regions are when a fire or gas of interest is present and therefore an alarm is desirable.

Figure 9:
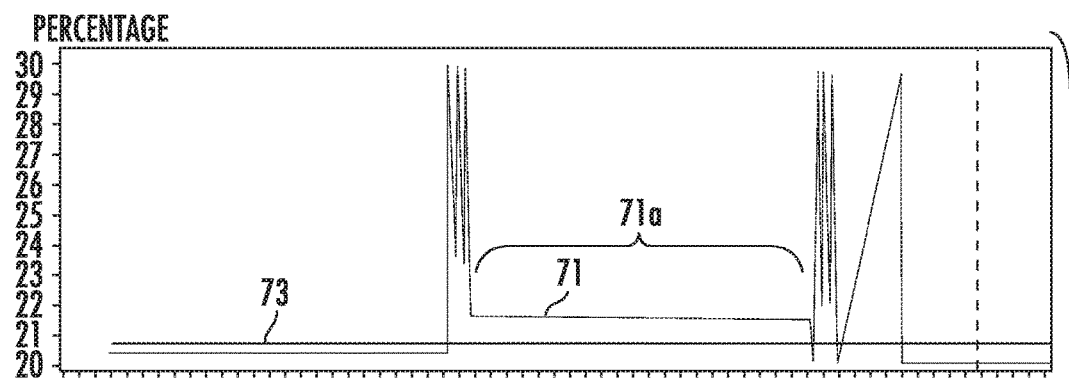
FIG. 9 illustrates graphs of sensor level as a percentage versus time to demonstrate an example of signal features evaluation.
Figure 9:
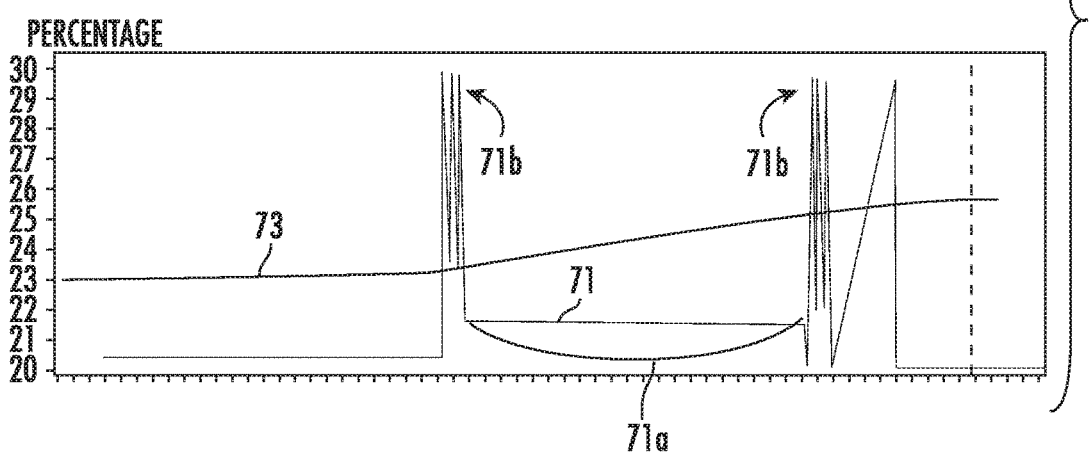

The reference set of environmental tests may be an experimental test, such as exposure to given levels of smoke over a period of time. In another example, the operation is based on a simulated algorithm response decision or field collected data. For instance, the same sensor 42 responses are run to determine how changes in the controller 132 would impact the alarm response decision. FIG. 9 illustrates example graphs in which data as a percent transmission was recorded at 1 second intervals. The intensity of the sensor 42 signal features are represented by lines 71. The alarm response decision value is shown by lines 73. When line 71 is greater than line 73 at a given time, the alarm response decision relationship is true and an alarm is triggered. The graphs demonstrate that two signal feature evaluations may have different algorithm response decisions. In the case of the top graph, the algorithm response decision line 73 is constant, and thus a large portion of the line 71, including a plateau portion 71a, is above the line 73. In the case of the lower graph, the algorithm response decision line 73 varies through the reference test, and only peaks 71b are above the line 73 while the plateau portion 71a is below line 73.

Figure 10:
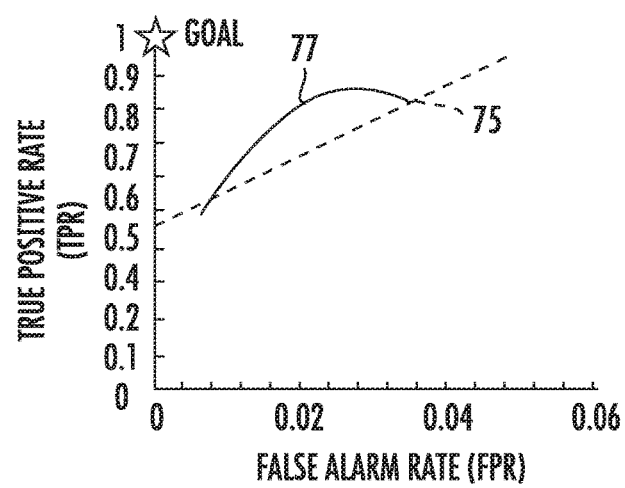
FIG. 10 illustrates a plot of true positive rate and false positive rate for two signal features.

The performance metric may be calculated from comparing output of the alarm response decision to known representative environments. In one example, the performance metric is the number of correctly identified values or the true positive rate (TPR) based on the alarm response decision relationship line 73 compared to the number of incorrectly identified values called the false positive rate (FPR) outputted based on the alarm response decision relationship line 73. The value of TPR and FPR ranges from 0 to 1; and a pair of TPR and FPR values are calculated for each parameter as described below. As a number of parameters are tabulated, the values may be plotted. An example of such a plot is shown in FIG. 10, in which the resulting TPR and FPR of the first signal feature at line 75 and the second signal features at line 77 are plotted across several parameter variations. The parameters may be changes to the sensor 42 (e.g., number, response, type, filter wavelength, or orientation), light source (e.g., wavelength, light intensity, or pulse frequency), controller (e.g., feature, feature evaluation, algorithm, or relationship), fluid mover (e.g., fan speed, oscillation period, and magnitude). Thus, the TPR and FPR values are related to a set of detector unit parameters.

A combination of parameters may then be selected for a performance metric closest to a desired performance goal by selection of the parameters based on the resulting TPR, FPR, or both. In some cases weights are applied to either values or both values. In one example, the maximum TPR value that has the minimum FPR value is considered optimum. The performance goal in some examples may have a TPR equal to 1 and a FPR value equal to 0. In other cases, the FPR value is increased slightly to select parameters with a higher TPR value. This may be achieved by graphically calculating the linear distance of a TPR and FPR pair to a given goal and comparing all tabulated linear distances to determine the minimum linear distance. The identified TPR and FPR pair that has the minimum linear distance provides an optimized detector operation with respect to the reference test. The optimization technique reduces variability by balancing hardware performance with the detection algorithms that cannot be achieved by aspirating systems that rely on fixed sensitivity.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An aspirating detector system comprising:
    a detector including,
        a chamber having an inlet and an outlet for flow of an analyte,
        a light source adjacent the chamber, the light source, when operated, emitting a light beam through the chamber over a range of wavelengths, wherein the light source is aimed at the outlet such that, when operated, the light beam exits the chamber through the outlet, and
        a sensor adjacent the chamber and operable to emit sensor signals responsive to received light from interaction of the light beam with the analyte, wherein the sensor is outside of the chamber and aligned with the light source and the outlet; and
    a controller connected to receive the sensor signals, the controller configured to determine whether a target substance is present in the analyte based on an intensity of the received light via the sensor signals.

2. The aspirating detector system as recited in claim 1, wherein the chamber is hemispherical.

3. The aspirating detector system as recited in claim 1, wherein the light source has a variable intensity.

4. The system in claim 1, wherein the controller is configured to switch the light beam between a detection mode of operation and an analytic mode of operation in response to, respectively, a determination that the target substance is not present and a determination that the target substance is present.

5. The aspirating detector system as recited in claim 1, wherein the controller is configured to determine a chemical identity of the target substance from a spectrum of the received light over the range of wavelengths via the sensor signals.

6. The aspirating detector system as recited in claim 5, wherein the controller is configured to trigger an alarm in response to determining the chemical identity and that the target substance is present above a threshold.

7. The aspirating detector system as recited in claim 1, wherein the controller is configured to determine a chemical identity of one or more non-target substances in the analyte from a spectrum of the received light over the range of wavelengths via the sensor signals and trigger an alarm only if the non-target substance is present above a non-target substance threshold.

8. The aspirating detector as recited in claim 1, wherein the controller is configured to determine a dynamic reference condition of the analyte based on one or more wavelengths over the range of wavelengths of the light beam, compare the sensor signals to the dynamic reference condition, and trigger an alarm in response to one or more of the sensor signals exceeding the dynamic reference condition by a threshold amount.

9. The aspirating detector system as recited in claim 1, further comprising a speed-oscillating fluid mover and an analyte collector network connected with the inlet of the chamber, the analyte collector network having conduits and a plurality of ports, the conduits connecting the plurality of ports to the inlet of the chamber, and the speed-oscillating fluid mover operable to draw analyte through ports into the conduits to deliver the analyte to the inlet of the chamber.

10. The aspirating detector system as recited in claim 9, wherein the speed-oscillating fluid mover is operable to continuously oscillate.

11. The aspirating detector system as recited in claim 9, further comprising a filter in the analyte collector network and a flow sensor in the analyte collector network downstream of the filter and operable to emit flow sensor signals, wherein the controller is connected with the speed-oscillating fluid mover and the flow sensor to receive the flow sensor signals, the controller configured to determine whether the filter becomes obstructed based on a response of the flow sensor to speed-oscillations of the speed-oscillating fluid mover.

12. A method for detecting a target substance in an aspirating detector system, the method comprising:
   circulating an analyte through a detector that includes
      a chamber that has an inlet and an outlet for flow of the analyte,
      a light source adjacent the chamber, the light source emits a light beam through the chamber over a range of wavelengths, the light source is aimed at the outlet such that the light beam exits the chamber through the outlet, and
      a sensor outside of the chamber and aligned with the light source and the outlet, the sensor emits sensor signals responsive to received light from interaction of the light beam with the analyte circulating through the chamber; and
   determining whether a target substance is present in the analyte in the detector based on an intensity of the received light via the sensor signals.

13. The method as recited in claim 12, further comprising varying an intensity of the light beam.

14. The method as recited in claim 12, further comprising switching the light beam between a detection mode of operation and an analytic mode of operation in response to, respectively, a determination that the target substance is not present and a determination that the target substance is present.

15. The method as recited in claim 12, further comprising determining a chemical identity of the target substance from a spectrum of the received light over the range of wavelengths via the sensor signals.

16. The method as recited in claim 15, further comprising triggering an alarm in response to determining the chemical identity and that the target substance is present above a threshold.

17. An aspirating detector system comprising:
   a detector including,
      a mirrored chamber having an inlet and an outlet for flow of an analyte,
      a light source adjacent the chamber, the light source, when operated, emitting a light beam through the chamber over a range of wavelengths, wherein the light source is aimed at the outlet such that, when operated, the light beam exits the chamber through the outlet,
      a sensor adjacent the chamber and operable to emit sensor signals responsive to received light from interaction of the light beam with the analyte, and
      a beam stop located outside the chamber adjacent the outlet and intercepting the light beam when the light source is operated, wherein the chamber is hemispherical and the sensor is located central to a curvature of the chamber so that scattered light from interaction of the light beam with the analyte is focused toward the sensor as the received light.

18. An aspirating detector system comprising:
   a detector including,
      a chamber having an inlet and an outlet for flow of an analyte,
      a light source adjacent the chamber, the light source, when operated, emitting a light beam through the chamber over a range of wavelengths, and
      a sensor adjacent the chamber and operable to emit sensor signals responsive to received light from interaction of the light beam with the analyte; and
   a controller connected to receive the sensor signals, the controller configured to determine whether a target substance is present in the analyte based on an intensity of the received light via the sensor signals and to determine a dynamic reference condition of the analyte based on one or more wavelengths over the range of wavelengths of the light beam, compare the sensor signals to the dynamic reference condition, and trigger an alarm in response to one or more of the sensor signals exceeding the dynamic reference condition by a threshold amount, wherein the dynamic reference condition is based upon a distribution of signal levels of the sensor signals taken at regular intervals, and the controller continuously updates the dynamic reference condition as new ones of the sensor signals are received and a weighted impact of past ones of the sensor signals on the distribution is reduced as the dynamic reference condition is updated with the new ones of the sensor signals.

19. The aspirating detector system as recited in claim 18, wherein the controller is configured to determine a chemical identity of one or more non-target substances in the analyte from a spectrum of the received light over the range of wavelengths via the sensor signals and trigger an alarm only if the non-target substance is present above a non-target substance threshold.

20. The aspirating detector system as recited in claim 18, wherein the chamber is hemispherical.

\* \* \* \* \*